(12) United States Patent
Sei et al.

(10) Patent No.: US 8,876,215 B2
(45) Date of Patent: Nov. 4, 2014

(54) VEHICLE SEAT FRAME STRUCTURE

(75) Inventors: Kousuke Sei, Toyota (JP); Keisuke Yamamoto, Toyota (JP); Yukinori Sugiura, Nissin (JP); Takanori Kinoshita, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 27 days.

(21) Appl. No.: 13/564,206

(22) Filed: Aug. 1, 2012

(65) Prior Publication Data

US 2013/0033083 A1   Feb. 7, 2013

(30) Foreign Application Priority Data

Aug. 4, 2011   (JP) .................................. 2011-170838

(51) Int. Cl.
| | | |
|---|---|---|
| *A47C 7/30* | (2006.01) | |
| *B60N 2/72* | (2006.01) | |
| *B60N 2/70* | (2006.01) | |
| *B60N 2/68* | (2006.01) | |

(52) U.S. Cl.
CPC ........ *B60N 2/682* (2013.01); *B60N 2/72* (2013.01); *B60N 2/7058* (2013.01)
USPC ............. 297/452.52; 297/452.53; 297/452.54

(58) Field of Classification Search
USPC ....................... 297/452.52, 452.53, 452.54
See application file for complete search history.

(56) References Cited

U.S. PATENT DOCUMENTS

| | | | |
|---|---|---|---|
| 2,260,352 A | | 1/1938 | Trapani |
| 3,475,770 A | * | 11/1969 | Gunlock ............... 297/452.52 X |
| 6,854,804 B2 | * | 2/2005 | Cruz Fernandes de Pinho et al. ......................... 297/452.52 |
| 7,090,301 B2 | * | 8/2006 | Stadlbauer ............... 297/452.52 |
| 7,775,603 B2 | * | 8/2010 | Mundell et al. ........... 297/452.52 |
| 7,905,545 B2 | * | 3/2011 | Andersson et al. ... 297/452.52 X |
| 7,926,872 B2 | * | 4/2011 | Chida et al. ........... 297/452.52 X |
| 7,954,893 B2 | | 6/2011 | Yokota et al. |
| 2003/0227203 A1 | * | 12/2003 | Mundell ............... 297/452.52 X |
| 2005/0173957 A1 | * | 8/2005 | Schwarzbich et al. ..... 297/284.4 |

FOREIGN PATENT DOCUMENTS

| | | |
|---|---|---|
| DE | 2729089 | 1/1979 |
| FR | 2932431 | 12/2009 |
| JP | 5-82340 | 11/1993 |
| JP | 2001-008793 | 1/2001 |
| JP | 2005-132155 | 5/2005 |
| JP | 2007-089881 | 4/2007 |
| JP | 2009-112698 | 5/2009 |

OTHER PUBLICATIONS

Germany Office action, dated May 10, 2013 along with an english translation thereof.

* cited by examiner

*Primary Examiner* — Rodney B White
(74) *Attorney, Agent, or Firm* — Greenblum & Bernstein, P.L.C.

(57) ABSTRACT

A vehicle seat frame structure includes a frame main body formed in a frame-shape, and a wire that extends between two frame peripheral portions that make up the frame main body, end portions of the wire being integrally joined to the two frame peripheral portions. At each of the end portions of the wire, a portion that jut outs beyond the corresponding frame peripheral portion is formed as a curved portion that is curved in a direction wrapping around an outer peripheral surface of the frame peripheral portion. At least one of the curved portions of the wire has a curvature that is more gradual than a curvature of the outer peripheral surface of the frame peripheral portion to which the curved portion is joined.

7 Claims, 3 Drawing Sheets

VEHICLE SEAT FRAME STRUCTURE

INCORPORATION BY REFERENCE

The disclosure of Japanese Patent Application No. 2011-170838 filed on Aug. 4, 2011 including the specification, drawings and abstract is incorporated herein by reference in its entirety.

BACKGROUND OF THE INVENTION

1. Field of the Invention

The invention relates to vehicle seat frame structure.

2. Description of Related Art

A related frame structure of a seat back of a vehicle seat has a plurality of wires for supporting a cushion pad that extend across a frame main body (Japanese Utility Model Application Publication No. 5-82340 (JP 5-82340 U)). More specifically, end portions of the wires are joined to frame peripheral portions that make up the frame main body. The end portions of the wires are strongly fixed to the frame peripheral portions by the end portions of the wires being curved following the shapes of the frame peripheral portions such that the contact area between the end portions of the wires and the frame peripheral portions increases, and the contact portions of the end portions of the wires and the frame peripheral portions being welded together.

However, with the related art described in JP 5-82340 U, if there is a difference in the length relationship between the wires and the frame main body due to manufacturing error, the wires may not be able to be assembled to the frame peripheral portions, or the abutting area of the wires and the frame peripheral portions may not be able to be sufficiently ensured, which is problematic.

SUMMARY OF THE INVENTION

The invention thus provides a vehicle seat frame structure in which assemblability of wires and a frame main body is able to be suitably maintained even if there is a difference in the length relationship between the wires and the frame main body due to manufacturing error.

One aspect of the invention relates to a vehicle seat frame structure that includes a frame main body formed in a frame-shape, and a wire that extends between two frame peripheral portions that make up the frame main body, end portions of the wire being integrally joined to the two frame peripheral portions. At each of the end portions of the wire, a portion that juts out beyond the frame peripheral portion to which the wire is joined is formed as a curved portion that is curved in a direction wrapping around an outer peripheral surface of the frame peripheral portion. At least one of the curved portions of the wire has a curvature that is more gradual than a curvature of the outer peripheral surface of the frame peripheral portion to which the curved portion is joined.

According to this aspect, at least one curved portion of the wire is shaped having a more gradual curve than the curvature of the outer peripheral surface of the frame peripheral portion, so the state in which the curved portion is abutted against the outer peripheral surface of the frame peripheral portion is able to be maintained at various positions with the wire displaced in the length direction. Therefore, even if there is a difference in the length relationship between the wire and the frame main body due to manufacturing error, assemblability of these parts can be suitably maintained.

In the aspect described above, the frame peripheral portions may be formed by a circular pipe, and the curved portion may have a more gradual curvature than the curvature of the outer peripheral surface of the frame peripheral portion.

According to this structure, the curved surfaces of the wire and the frame peripheral portions are abutted together, so a large abutting area of the two is able to be ensured, which enables the joint strength from welding or the like to be increased. Also, the curved portions of the wire are curved, so the wire can be formed without any angles.

In the aspect described above, the curved portions on both end sides of the wire may have curvatures that are more gradual than the curvatures of the outer peripheral surfaces of the frame peripheral portions to which the curved portions are joined.

According to this structure, by employing a structure in which the curved portions of the end portions of the wire are gradually curved on both end sides, a difference in the length relationship between the wire and the frame main body is able to be distributed little by little to both end sides of the wire and thus absorbed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A is a partial enlarged view of FIG. 1;

FIG. 1B is another partial enlarged view of FIG. 1;

DETAILED DESCRIPTION OF EMBODIMENTS

Hereinafter, example embodiments of the invention will be described with reference to the accompanying drawings.

Figure 1:
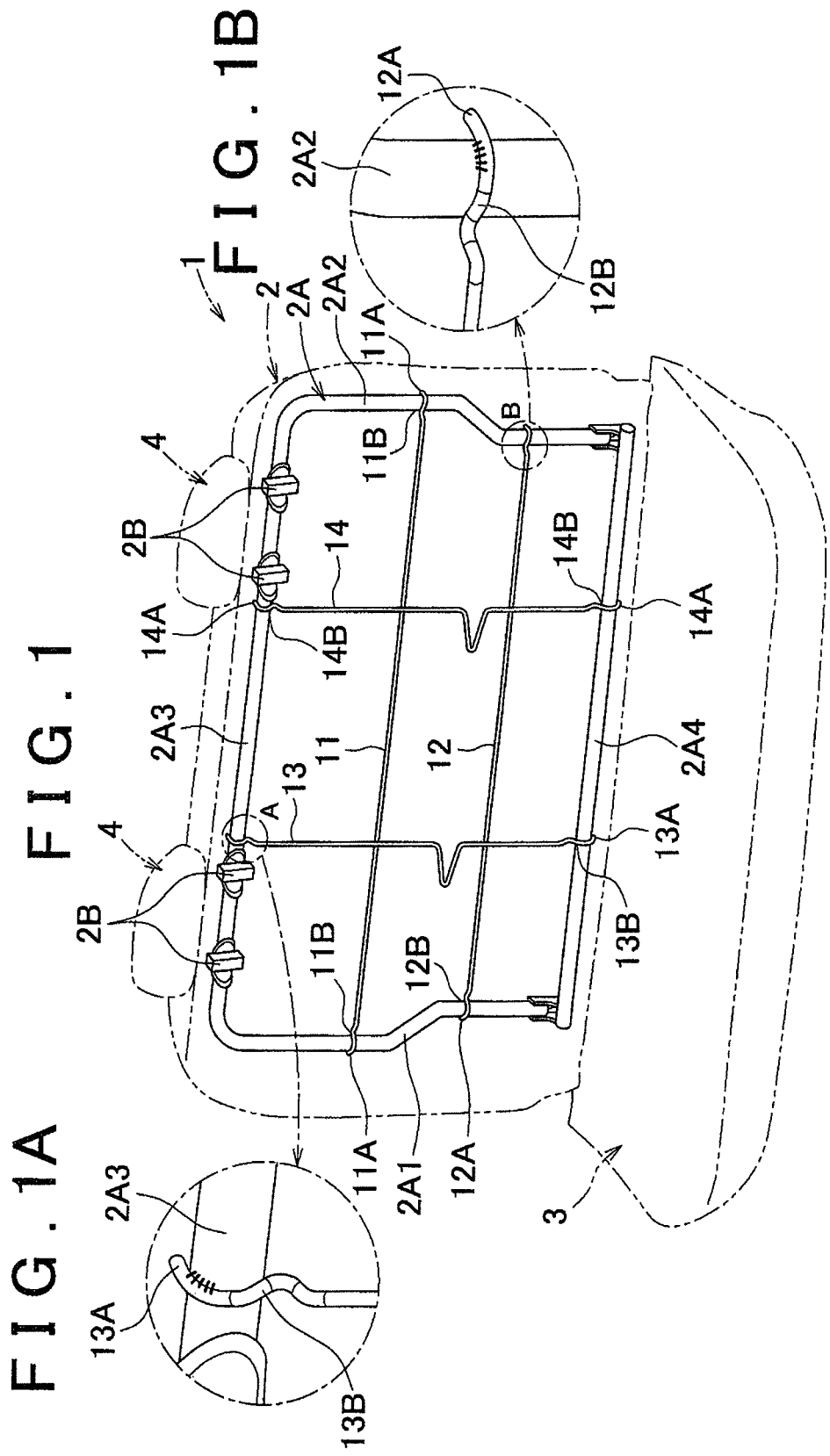
FIG. 1 is a perspective view schematically showing a frame structure of a vehicle seat.
Figure 2:
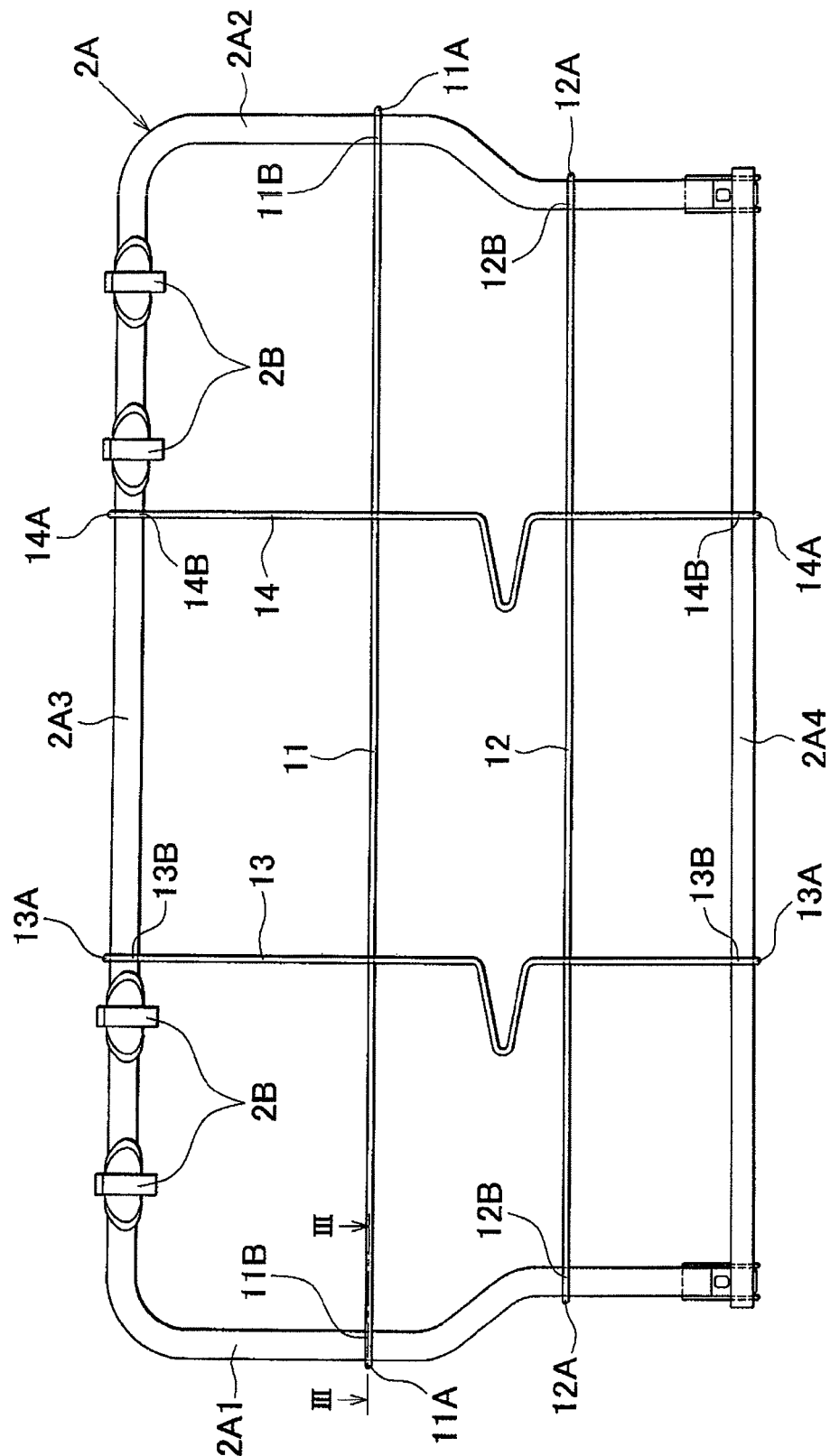
FIG. 2 is a front view of the frame structure of the vehicle seat.

First, the structure of a frame structure of a vehicle seat according to one example embodiment will be described with reference to FIGS. 1 to 3. The vehicle seat 1 of this example embodiment is configured as a seat for sitting on, that seats three people and is arranged in a last row in a vehicle, as shown in FIG. 1. This vehicle seat 1 includes a seat back 2 that functions as a backrest for seated occupants, a seat cushion 3 that is a seating portion, and headrests 4 that function as supports for the heads of the seated occupants. The seat back 2, the seat cushion 3, and the headrests 4 are each configured with a cushion pad of foamed urethane resin assembled onto a frame structure provided in each (i.e., each of the seat back 2, the seat cushion 3, and the headrests 4), and the entire outer surface of the cushion pad covered by a fabric cover.

Of these, the frame structure inside of the seat back 2 is formed by a seat back frame 2A that is formed by shaping a steel pipe (round steel pipe) into a frame-shape. Here, the seat back frame 2A functions as a frame main body of the invention. More specifically, the seat back frame 2A is formed by joining a straight steel pipe to both lower end portions of a frame that is formed by bending steel pipe into an inverted U-shape. As a result, the seat back frame 2A is formed into a rectangular frame shape having side frame peripheral portions 2A1 and 2A2 that oppose each other in a seat width direction on left and right side portions, and transverse frame peripheral portions 2A3 and 2A4 that extend between upper end portions and lower end portions, respectively, of these side frame peripheral portions 2A1 and 2A2 and oppose each other in a seat height direction. Square column-shaped holders 2B are fixed by welding, two on the left and two on the right for a total of four, to a front surface portion of the transverse frame peripheral portion 2A3 that is on the upper side. The holders 2B fix support members for attaching stays, not shown, of two headrests 4 provided on an upper portion of the seat back 2.

Wires 11 to 14 made of steel wire, two longitudinal and two lateral for a total of four wires, extend across the inside of the seat back frame 2A. The wires 11 to 14 support, from a rear side of the seat, a cushion pad, not shown, that is arranged on a front surface side of the seat back frame 2A. Of these, the two lateral wires 11 and 12 are arranged in the seat width direction, and both end portions of the wires 11 and 12 are integrally joined to both side frame peripheral portions 2A1 and 2A2 of the seat back frame 2A. The two longitudinal wires 13 and 14 are arranged in the seat height direction, and both end portions of the wires 13 and 14 are integrally joined to both transverse frame peripheral portions 2A3 and 2A4 of the seat back frame 2A.

More specifically, the end portions of the two lateral wires 11 and 12 are abutted from the front surface side of the seat against the outer peripheral surfaces of the side frame peripheral portions 2A1 and 2A2, and the abutting surfaces are integrally joined together by arc welding. Also, the end portions of the two longitudinal wires 13 and 14 are abutted from the front surface side of the seat against the outer peripheral surfaces of the transverse frame peripheral portions 2A3 and 2A4, and the abutting surfaces are integrally joined together by arc welding.

Even more specifically, at the end portions of the two lateral wires 11 and 12, portions that jut out beyond the outside in the seat width direction of the side frame peripheral portions 2A1 and 2A2 of the seat back frame 2A are formed as outside curved portions 11A and 12A that are curved toward the rear side of the seat along the outer peripheral surfaces of the side frame peripheral portions 2A1 and 2A2. Also, portions of the wires 11 and 12 that are on the inside in the seat width direction of the side frame peripheral portions 2A1 and 2A2 are also formed as inside curved portions 11B and 12B that are curved toward the rear side of the seat along the outer peripheral surfaces of the side frame peripheral portions 2A1 and 2A2, similar to the outside curved portions 11A and 12A. Here, the outside curved portions 11A and 12A each function as a curved portion of the invention.

Also, at the end portions of the two longitudinal wires 13 and 14, portions that jut out beyond the outside (i.e., the upper side or the lower side) in the seat height direction of the transverse frame peripheral portions 2A3 and 2A4 of the seat back frame 2A are formed as outside curved portions 13A and 14A that are curved toward the rear side of the seat along the outer peripheral surfaces of the transverse frame peripheral portions 2A3 and 2A4. Also, portions positioned on the inside (i.e., the lower side or the upper side) in the seat height direction of the transverse frame peripheral portions 2A3 and 2A4 of the wires 13 and 14 are also formed as inside curved portions 13B and 14B that are curved toward the rear side of the seat along the outer peripheral surfaces of the transverse frame peripheral portions 2A3 and 2A4, similar to the outside curved portions 13A and 14A. Here, the outside curved portions 13A and 14A each function as a curved portion of the invention.

Figure 3:
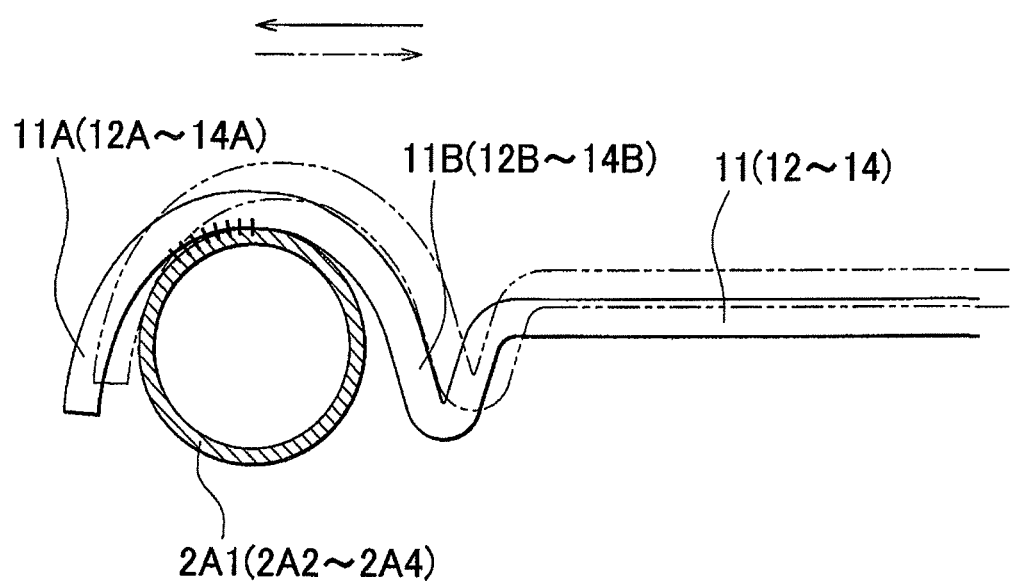
FIG. 3 is a sectional view taken along line III-III in FIG. 2.

The outside curved portions 11A and 12A and the inside curved portions 11B and 12B of the two lateral wires 11 and 12 each have a more gradual curvature than the curvature of the outer peripheral surfaces of the side frame peripheral portions 2A1 and 2A2 (see FIG. 3). Therefore, the state in which the outside curved portions 11A and 12A and the inside curved portions 11B and 12B are abutted against the outer peripheral surfaces of the side frame peripheral portions 2A1 and 2A2 is able to be maintained at various positions with the wires 11 and 12 displaced in the length direction (i.e., the seat width direction). Therefore, even if there is a difference between the lengths of the wires 11 and 12 and the length between the side frame peripheral portions 2A1 and 2A2 due to manufacturing error, and as a result, the locations where the wires 11 and 12 abut against the side frame peripheral portions 2A1 and 2A2 shift, the outside curved portions 11A and 12A or the inside curved portions 11B and 12B are still able to abut against the side frame peripheral portions 2A1 and 2A2. That is, the welding area for welding the wires 11 and 12 to the side frame peripheral portions 2A1 and 2A2 can be kept constant, so assemblability of these parts can be suitably maintained. The inside curved portions 11B and 12B of the wires 11 and 12 function as bended portions that enable the wires 11 and 12 to easily bend to the rear side of the seat when the wires 11 and 12 receive a backrest load from a seated occupant.

Also, similarly, the outside curved portions 13A and 14A and the inside curved portions 13B and 14B of the two longitudinal wires 13 and 14 each have a more gradual curvature than the curvature of the outer peripheral surfaces of the transverse frame peripheral portions 2A3 and 2A4 (see FIG. 3). Therefore, the state in which the outside curved portions 13A and 14A and the inside curved portions 13B and 14B are abutted against the outer peripheral surfaces of the transverse frame peripheral portions 2A3 and 2A4 is able to be maintained at various positions with the wires 13 and 14 displaced in the length direction (i.e., the seat height direction). Therefore, even if there is a difference between the lengths of the wires 13 and 14 and the length between the transverse frame peripheral portions 2A3 and 2A4 due to manufacturing error, and as a result, the locations where the wires 13 and 14 abut against the transverse frame peripheral portions 2A3 and 2A4 shift, the outside curved portions 13A and 14A or the inside curved portions 13B and 14B are still able to abut against the transverse frame peripheral portions 2A3 and 2A4. That is, the welding area for welding the wires 13 and 14 to the transverse frame peripheral portions 2A3 and 2A4 can be kept constant, so assemblability of these parts can be suitably maintained. The inside curved portions 13B and 14B of the wires 13 and 14 function as bended portions that enable the wires 13 and 14 to easily bend to the rear side of the seat when the wires 13 and 14 receive a backrest load from a seated occupant.

In this way, with the vehicle seat frame structure in this example embodiment, the frame peripheral portions 2A1 to 2A4 of the seat back frame 2A are formed by circular pipes, and the curved portions (i.e., the outside curved portions 11A to 14A) of the wires 11 to 14 that are joined to these frame peripheral portions 2A1 to 2A4 are curved at a more gradual curvature than the curved outer peripheral surfaces of the frame peripheral portions 2A1 to 2A4 are. Therefore, the curved surfaces of the wires 11 to 14 and the frame peripheral portions 2A1 to 2A4 are abutted together, so a large abutting area (i.e., the welding area) of the two (i.e., the wires and the frame peripheral portions) is able to be ensured, which enables the joint strength from welding them together to be increased. Also, the curved portions (i.e., the outside curved portions 11A to 14A) of the wires 11 to 14 are curved, so the wires 11 to 14 can be formed without any angles. Further, by employing a structure in which both end portions of the wires 11 to 14 are gradually curved, a difference in the length relationship between the wires 11 to 14 and the seat back frame 2A is able to be distributed little by little to both end sides of the wires 11 to 14 and thus absorbed.

Heretofore, one example embodiment of the invention has been described, but the invention may also by carried out in various modes other than that of the example embodiment described above. For example, in the example embodiment described above, the vehicle seat frame structure of the invention is applied to the frame structure of the seat back 2 of the vehicle seat 1, but this frame structure may also be applied to the frame structures of various portions that make up a vehicle seat, such as a seat cushion and a headrest and the like.

Also, only the curved portions of the end portions on at least one side of the wires need be formed curved with a more gradual curvature than the curved outer peripheral surfaces of the frame peripheral portions of the frame main body. Also, the curved portions formed on the end portions of the wires may be formed with angles by bending them. In other words, the widths of the open portions of the curved portions need only be greater than the widths of the frame peripheral portions. Also, the frame peripheral portions of the frame main body that the curved portions abut against may also be formed in shapes having an angular tube-shaped cross section. Further, the wires are wires that are provided extending between two frame peripheral portions that make up the frame main body, and may also be wires that are provided extending between frame peripheral portions that are adjacent to each other.

What is claimed is:

1. A vehicle seat frame structure comprising:
a frame main body formed in a frame-shape; and
a wire that extends between two frame peripheral portions that make up the frame main body, end portions of the wire being integrally joined to the two frame peripheral portions,
wherein at each of the end portions of the wire, a portion that juts out beyond the frame peripheral portion to which the wire is joined is formed as a curved portion that is curved in a direction wrapping around an outer peripheral surface of the frame peripheral portion; and at least one of the curved portions of the wire has a curvature that is more gradual than a curvature of the outer peripheral surface of the frame peripheral portion to which the curved portion is joined, wherein the entire curved portion is oriented in a single plane that is perpendicular to a longitudinal axis of the frame peripheral portion to which the curved portion is joined.

2. The vehicle seat frame structure according to claim 1, wherein the frame peripheral portions are formed by a circular pipe; and the curved portion has a more gradual curvature than the curvature of the outer peripheral surface of the frame peripheral portion.

3. The vehicle seat frame structure according to claim 1, wherein that the curved portions on both end sides of the wire have curvatures that are more gradual than the curvatures of the outer peripheral surfaces of the frame peripheral portions to which the curved portions are joined.

4. The vehicle seat frame structure according to claim 1, wherein each of the curved portions has an outside curved portion that juts out beyond an outside of the corresponding frame peripheral portion.

5. The vehicle seat frame structure according to claim 1, wherein each of the curved portions has an inside curved portion that juts out beyond an inside of the corresponding frame peripheral portion.

6. The vehicle seat frame structure according to claim 5, wherein a width of an open portion of each curved portion is greater than a width of the corresponding frame peripheral portion.

7. The vehicle seat frame structure according to claim 1, wherein a weld that joins the curved portion and the frame portion is oriented in the single plane that is perpendicular to the longitudinal axis of the frame portion to which the curved portion is joined.

* * * * *